US010706729B2

(12) United States Patent
Cao et al.

(10) Patent No.: US 10,706,729 B2
(45) Date of Patent: Jul. 7, 2020

(54) JOINT SEARCH METHOD FOR UAV MULTIOBJECTIVE PATH PLANNING IN URBAN LOW ALTITUDE ENVIRONMENT

(71) Applicant: BEIHANG UNIVERSITY, Beijing (CN)

(72) Inventors: Xianbin Cao, Beijing (CN); Zhenyu Xiao, Beijing (CN); Peng Yang, Beijing (CN); Chao Yin, Beijing (CN); Xing Xi, Beijing (CN); Dapeng Wu, Beijing (CN)

(73) Assignee: BEIHANG UNIVERSITY, Beijing (CN)

( * ) Notice: Subject to any disclaimer, the term of this patent is extended or adjusted under 35 U.S.C. 154(b) by 185 days.

(21) Appl. No.: 15/956,729

(22) Filed: Apr. 18, 2018

(65) Prior Publication Data
US 2018/0308371 A1 Oct. 25, 2018

(30) Foreign Application Priority Data
Apr. 19, 2017 (CN) .......................... 2017 1 0255262

(51) Int. Cl.
*G08G 5/00* (2006.01)
*B64C 39/02* (2006.01)
*G08G 5/04* (2006.01)

(52) U.S. Cl.
CPC ......... *G08G 5/0069* (2013.01); *B64C 39/024* (2013.01); *G08G 5/0034* (2013.01); *G08G 5/0039* (2013.01); *G08G 5/045* (2013.01)

(58) Field of Classification Search
CPC .. G08G 5/0069; G08G 5/0034; G08G 5/0039; G08G 5/045; B64C 39/024; B64C 2201/14; G05D 1/12
(Continued)

(56) References Cited

U.S. PATENT DOCUMENTS

2009/0322584 A1* 12/2009 Herman ................ G01S 13/726
342/13
2010/0017114 A1* 1/2010 Tehan .................... G01C 21/00
701/423
(Continued)

OTHER PUBLICATIONS

N. Wen et al, "UAV online path planning algorithm in a low altitude dangerous environment," IEEE/CAA Journal of Automatica Sinica, vol. 2, No. 2, 2015, pp. 173-185.
(Continued)

*Primary Examiner* — Jonathan M Dager
*Assistant Examiner* — Jean W Charleston
(74) *Attorney, Agent, or Firm* — Pai Patent & Trademark Law Firm; Chao-Chang David Pai

(57) ABSTRACT

A joint search method for UAV multiobjective path planning in an urban low altitude environment first constructs a static safety index map based on static known obstacles. Meanwhile, based on proactively detected obstacles that are not marked on a geographic map by a UAV, the method constructs online a dynamic safety index map. Second, a multiobjective path planning problem is solved using a joint offline and online search method. Moreover, this method first plans offline the least cost path from a starting point to an end point and then invokes the online search scheme to replan online a changed path when the UAV detects unknown obstacles. Thus, the UAV can avoid dynamic obstacles effectively. The online search scheme has a small search space and can quickly replan a safe path for the UAV, thus satisfying the requirement of UAV on the real-time path planning.

6 Claims, 12 Drawing Sheets

(58) Field of Classification Search
USPC .............................................................. 701/3
See application file for complete search history.

(56) References Cited

U.S. PATENT DOCUMENTS

| | | | | |
|---|---|---|---|---|
| 2010/0135120 | A1* | 6/2010 | Cecala | G01S 5/04 367/129 |
| 2010/0145552 | A1* | 6/2010 | Herman | G08G 5/0034 701/3 |
| 2013/0297096 | A1* | 11/2013 | Herman | F41H 3/00 701/1 |
| 2013/0297271 | A1* | 11/2013 | Herman | G06Q 10/10 703/8 |
| 2017/0162064 | A1* | 6/2017 | Ubhi | G01S 5/0027 |

OTHER PUBLICATIONS

P.P. Wu et al, "Multi-objective four-dimensional vehicle motion planning in large dynamic environments," IEEE Transactions on Systems Man & Cybernetics—Part B: Cybernetics, vol. 41, No. 3, 2011, pp. 621-634.

X. Peng et al, "UAV online path planning based on dynamic multiobjective evolutionary algorithm," in Proceeding of Control Conference (CCC), 2011 30th Chinese. IEEE, 2011, pp. 5424-5429.

* cited by examiner

JOINT SEARCH METHOD FOR UAV MULTIOBJECTIVE PATH PLANNING IN URBAN LOW ALTITUDE ENVIRONMENT

CROSS REFERENCE TO RELATED APPLICATIONS

This Application claims priority of China Patent Application No. 201710255262.6, filed on Apr. 19, 2017, the entirety of which is incorporated by reference herein.

BACKGROUND OF THE INVENTION

1. Technical Field

The invention belongs to the technical field of unmanned aerial vehicle path planning. Specifically, the invention refers to a joint-offline-and-online-based search method of multiobjective path planning for a UAV in urban low altitude environment.

2. Description of the Prior Art

Since the federal aviation administration (FAA) unveiled plans for domestic unmanned aerial vehicles (UAVs) to take off by 2015, the usage of UAVs has received significant attention. In future smart cities, UAV itself would play an important role in, but not limited to, cargo delivery, emergency communications, reconnaissance, fire-fighting, aerial photo, remote sensing, disaster rescue, etc. Moreover, when using internet of things (IoT) to improve smart cities, a UAV can be used to collect sensing data all over the cities, as well as outside the cities, for the sensors that cannot access to a global network. To benefit these usages of a UAV, it should be first safely and timely designated to the target area, which is the so-called path planning problem.

Path planning is the process of determining a collision-free pathway between a UAV's current position and its destination. Researchers have been studying how to generate collision-free paths for vehicles in obstacle environments, which is critical for autonomous vehicles. So far, three types of path planning methods have been proposed, namely the geometry method, the velocity space method, and the graph search method. The geometry method takes geometry information of obstacles in the map as an input to search for a path. Typical geometry methods include the potential field method, the vector field histogram method, and the Voronoi diagram method. The velocity space approach, which is a collision avoidance method considering the vehicle shape, kinematic and dynamic constraints, includes the curvature velocity method and the dynamic window method. The graph search approach aims to find the shortest path between two vertices in a certain graph, where the A* algorithm is known to be effective at finding the shortest path to a goal while avoiding obstacles.

However, these path planning approaches cannot be directly exploited to perform the UAV path planning in the low altitude dynamic urban environment, because they rely on timely updated global and deterministic map information. In a low altitude dynamic urban environment, the timely update of the global map information is almost unavailable to a UAV, which usually has a limited communication bandwidth. Moreover, there are always unexpected obstacles that may not be indicated on a geography map. In such a case, a UAV would possibly crash against the unexpected obstacles. Although path replanning can be leveraged to mitigate the uncertainty during flying, there are at least two significant problems:

1) Generating dynamically feasible trajectories in real time with limited onboard computational resources.

2) Dealing with the unpredictable changing surrounding environments within limited sensing range as well as limited GPS position precision.

To realize an efficient path planning and meanwhile guarantee the safety of a UAV during flying in a dynamic low-altitude urban environment, we need to address the dynamic replanning problem as well as the static preplanning problem.

To realize an efficient path planning for a UAV in urban low altitude environment, it is essential to guarantee the safe flight as well as the shortest possible flight time. This problem is the famous multiobjective path planning (MOPP) problem.

In recent years, researchers have developed various strategies to address the MOPP problem for UAVs. For example, Roberge et al., attempted to compute possible and quasi-optimal paths for UAVs in a complex 3-D environment by leveraging the genetic algorithm (GA) and the particle swarm optimization algorithm (PSO). Meanwhile, they adopted the "single-program, multiple-data" parallel programming paradigm technique to reduce the execution time so that the solution method was real-time. Hernandez-Hernandez et al., proposed a multiobjective A* algorithm to find a UAV path from a start point to a destination point, where travel time, path angle, fuel consumption and area deviation are considered. Tao et al., presented a modified genetic algorithm to solve the path planning problem with multiple objectives. Besides, Niendorf et al., proposed a method to deal with the UAV mission planning in hostile environments, where a tradeoff between short mission execution time and low risk was made. Moreover, Liu et al., put forward a synergistic self-adapted difference multiobjective evolution algorithm for path planning of UAV to fulfill the function of UAV's sensing and avoidance of obstacles. To accelerate the calculation speed the self-adapted adjustment strategy, crossing and variation were involved.

Although these MOPP algorithms have been developed to find an achievable path for a UAV flying in a complex environment, none of them has addressed the problem of dynamic obstacle avoidance. Most of them attempted to construct risk or forbidden zones only for static threats so that a UAV can be guided to bypass these forbidden areas.

To avoid both static and dynamic threats, Wen et al. proposed a novel method for UAV online path planning in low altitude dynamic environments. In this approach, the intuitionistic fuzzy set is used to model static threats, and a reachability set estimator is constructed to assess the dynamic threats. To reduce the cost of planning and rapidly obtain a low threat UAV path, a heuristic subgoal selector is proposed and integrated into the planning system. Although the proposed framework is certified to perform well in finding collision-free paths for a UAV, it only focused on solving a single objective (i.e., safety) path planning problem. They do not consider the multiobjective path planning problem.

To extend the solution to MOPP under dynamic environment, Wu et al. presented a grid-based multi-step A* (MSA*) search method to address the MOPP problem for UAVs operating in large, dynamic and uncertain 4-D environments. MSA* exploits a variable successor operator that enables variable track length, angle and velocity trajectory segments to find least expense paths. This variable successor operator provides an inherent tolerance to uncertainty based on the minimum distance between the path and grid sequence boundaries. Furthermore, by leveraging variable successor operators to create a multi-resolution, memory-efficient grid sampling structure, the search space was drastically reduced, and the computational efficiency was correspondingly improved. Besides, Peng et al. developed an online path planning scheme to solve the dynamic multi-objective optimization problem, where the local environmental information collected by onboard sensors was continuously updated to replan the UAV trajectory. However, these methods only concentrate on online path planning. They cannot make use of offline information, i.e., the geography map, to reduce the travel time.

BRIEF SUMMARY OF THE INVENTION

To make up for shortcomings of the existing techniques, this invention proposes an effective path planning method. When a UAV is executing a mission in a low altitude dynamic urban environment, this method can ensure that the UAV can reach the destination quickly and safely.

The invention provides a joint search method for UAV multiobjective path planning in urban low altitude environment, the steps of which include:

Step 1: Construct a static safety index map based on known static obstacles described on the geographic map. The static safety index map describes the static safety index at any point on the geographic map;

Step 2, the UAV will build a dynamic safety index map based on the obstacles that are not marked on the geographical map but are proactively detected by the UAV. The dynamic safety index map describes the dynamic safety index of a point in the space proactively detected by the UAV;

Step 3: Construct a multiobjective path planning problem of joint optimization of UAV flight time and flight safety. The problem is to minimize the flight time of the UAV and maximize the safety of the UAV;

Step 4: Solve the multiobjective path planning problem based on a joint offline and online search to yield the optimal path planning proposal.

According to the starting point, end point, static safety index map, and flight speed of the UAV, the invention uses the offline search scheme to plan an offline UAV flight path from the starting point to the end point. This path has the smallest path cost. During the flight, when the UAV detects unexpected obstacles, it will call the online search scheme to replan a UAV flight path to avoid dynamic obstacles. Meanwhile, if the straight path between the current point and the end point does not appear in the dynamic threat zones related to the unexpected obstacles, then the online search scheme is terminated, and a replanned path is created.

The advantages of the invention are as follows:

(1) The invention proposes the concept of static and dynamic safety index maps and generates the static safety index map and the dynamic safety index map. The introduction of two new safety index maps not only contributes to the content of UAV path planning problem but also specifies a new research idea for other path planning problems.

(2) The method of the invention first uses the offline search scheme to obtain the path between the starting point and the end point of the UAV. Therefore, the UAV needs not to collect the mass geographic map data online. Furthermore, it needs not to calculate a static safety index map that describes the safety of each point in the geographic map. In this way, the requirement of computing power on the UAV for solving the path planning problem is significantly reduced.

(3) The method of constructing a dynamic safety index map designed by the invention has low computational complexity, and the online search method of the invention has a small search space. Therefore, the invention can quickly return a replanned safe path for the UAV and can meet the real-time requirement of the path planning.

DETAILED DESCRIPTION OF THE INVENTION

Figure 1:
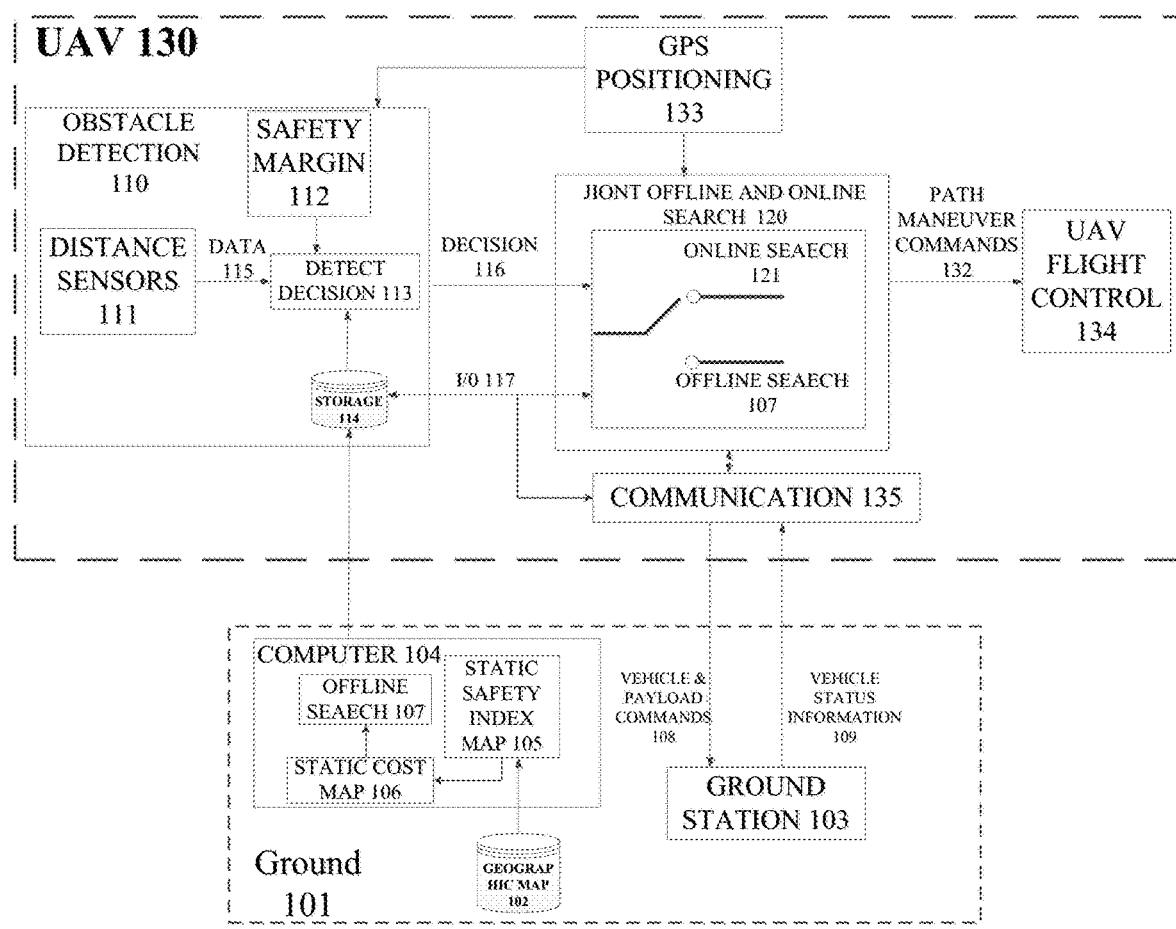
FIG. 1 illustrates a simplified block diagram of a UAV multiobjective path planning system.

The invention will now be further described referring to the attached drawings and examples.

The multiobjective path planning problem to be solved by the invention is to find the Pareto optimal path for the UAV 130 in a low altitude urban dynamic environment. The Pareto path can ensure the UAV 130 flight safety as well as the shortest possible flight time of arriving at the destination. For this purpose, the invention proposes two types of safety index maps, that is, static safety index map 105 and dynamic safety index map 129. The static safety index map 105 is constructed based on the known obstacles marked on the geographic map 102 (e.g., Baidu map). The dynamic safety index map 129 is constructed based on the dynamic obstacles that are not marked on the geographic map 102 but are proactively detected by the UAV 130. With these two maps, the invention generates the static cost distribution map 106 and the dynamic cost distribution map 131 respectively. Meanwhile, the invention proposes to solve the multiobjective path planning problem of the UAV 130 using a multiobjective path planning method. Flight time and safety index are two objectives.

The invention describes the multiobjective path planning problem using a space graph. The invention uses a triple $\langle G, S_{start}, S_{target} \rangle$ to represent the multiobjective path planning problem, where G=(N,A,c) denotes a space graph, N denotes a point set, A denotes a parameter set, c:A→$R^K$ represents a path cost function, $R^K$ denotes K dimensional space, K is the number of optimization objectives, K dimensional vector c(m,n) represents the total cost of the path from the starting point $\vec{s}_m$ to the end point $\vec{s}_n$, $S_{start}$ and $S_{target}$ indicate the starting point and end point of the UAV 130, respectively. Furthermore, we divide the geographical map into a large number of small squares. We refer to each square as a 'node', and there are eight nodes around each node, i.e., north node, north-east node, east node, south-east node, south node, south-west node, west node, and north-west node. Meanwhile, we call all these eight nodes as the neighbor nodes of the centric node. Furthermore, the distances between the centric node and the north, east, south, and west nodes are 1.13 meter. Certainly, this distance is adjustable.

For a multiobjective path planning problem, the Pareto optimal solution is often solved. The Pareto optimal path is defined as follows:

Definition 1: Given vectors $\vec{x}_1 \in R^K$ and $\vec{x}_2 \in R^K$. If and only if $\forall i$, $1 \leq i \leq K$, $\exists x_{1i} < x_{2i}$ and $\vec{x}_1 \neq \vec{x}_2$ where $x_{1i}$ and $x_{2i}$ represent the i-th element of $\vec{x}_1$ and $\vec{x}_2$, respectively, then we call $\vec{x}_1$ dominates $\vec{x}_2$ strongly, denoted by $\vec{x}_1 \prec \vec{x}_2$.

Definition 2: Given a vector set X. If and only if $\nexists \vec{y} \in X$ satisfies $\vec{y} \prec \vec{x}$, then $\vec{x} \in X$ is called non-dominant.

Definition 3: Let $P_{mn}$ be a set of all paths between two points $\vec{s}_m$ and $\vec{s}_n$, if and only if $\nexists p_2 \in P_{mn}$ satisfies $p_2 \prec p_1$, i.e., there is no path in $P_{mn}$ that is better than $p_1$ at all objectives, then the path $p_1 \in P_{mn}$ can be considered as a non-dominant path.

To solve the multiobjective path planning problem, the invention needs to solve the static path planning problem and the dynamic path replanning problem. The invention has the following modification and innovation:

(1) The introduction of a safety index concept. It is used to establish the safety index map (SIM) of an urban low altitude environment. The invention designs two safety index maps, i.e., static safety index map 105 and dynamic safety index map 129. The static safety index map 105 contains the main obstacle in the corresponding geographic map 102. The dynamic safety index map 129 contains unexpected obstacles that are not marked in the geographic map 102 during the UAV 130 flight. Furthermore, the static safety index map 105 is constructed offline based on the positioning error. The dynamic safety index map 129 is constructed online during the flight. Specifically, the UAV 130 will construct the dynamic safety index map 129 online when it detects unexpected obstacles that are not marked on the geographical map.

(2) The invention uses two kinds of safety index maps to construct two cost distribution maps, i.e., static cost distribution map 106 and dynamic cost distribution map 131, respectively. Based on these two kinds of cost distribution maps, the invention adopts a multiobjective path planning method that uses a joint offline and online search scheme 120 to solve the multiobjective path planning problem. Offline search algorithm (OFSA) 107 will attempt to find a Pareto optimal path from a starting point and an end point based on the static cost distribution map 106. This path does not pass through known obstacle areas. When the UAV 130 is flying, it will activate the online search algorithm (ONSA) 121 if it detects unmarked obstacles. Online search 121 is to use the dynamic search algorithm with low computational complexity to replan a UAV 130 path based on the dynamic cost distribution map 131. Similarly, this path does not pass through unknown obstacle areas that are not marked on the geographic map 102.

Figure 2:
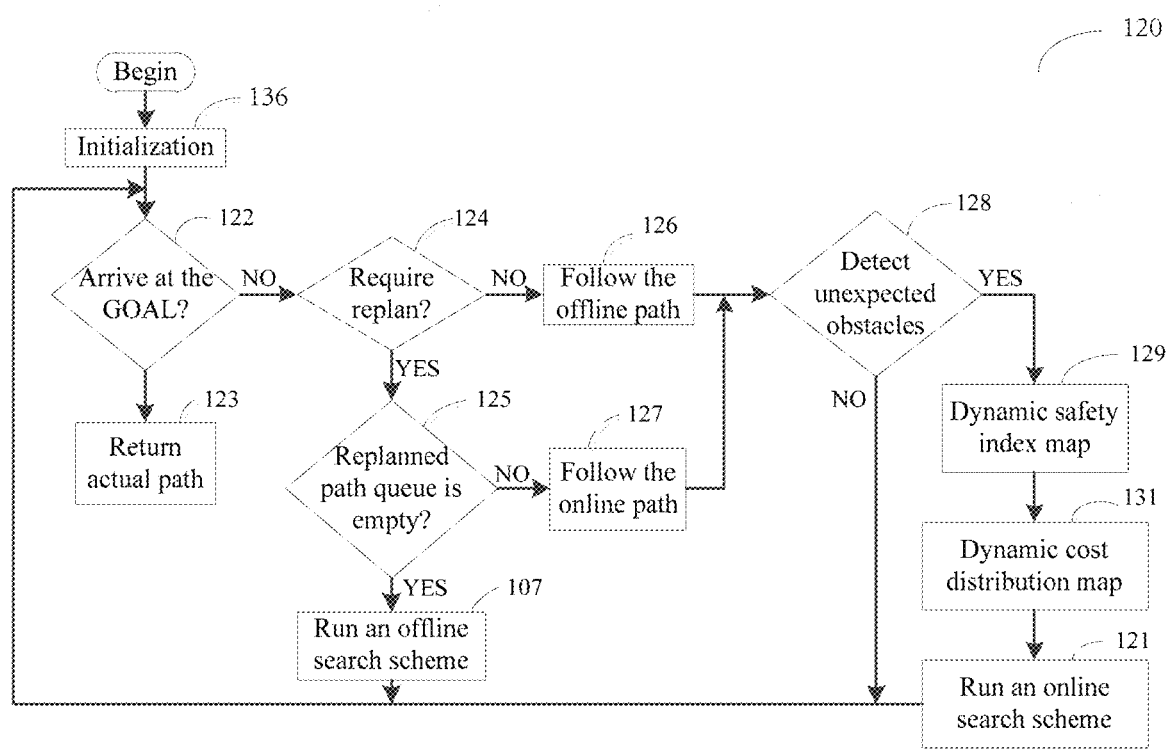
FIG. 2 illustrates the execution process of a joint offline and online search scheme.

Furthermore, to facilitate understanding a complete process of UAV path planning, this invention describes a UAV path planning system. FIG. 1 illustrates a simplified block diagram of a UAV path planning system. This system includes an obstacle detection module 110 coupled to a joint offline and online search module 120 that is in communication with a ground module 101, a GPS positioning module 133 and a UAV flight control module 134. FIG. 2 illustrates the detail execution process of a joint offline and online search scheme 120.

The multiobjective path planning method proposed in this invention includes four steps.

The First Step:

construct a static safety index map 105, S-SIMap, based on known static obstacles that have been marked on a geographic map 102. The map 102 stores a large amount of geographic map information, such as terrain, mountains, and buildings. This step is conducted in a computer module 104 of the ground module 101.

Figure 3:
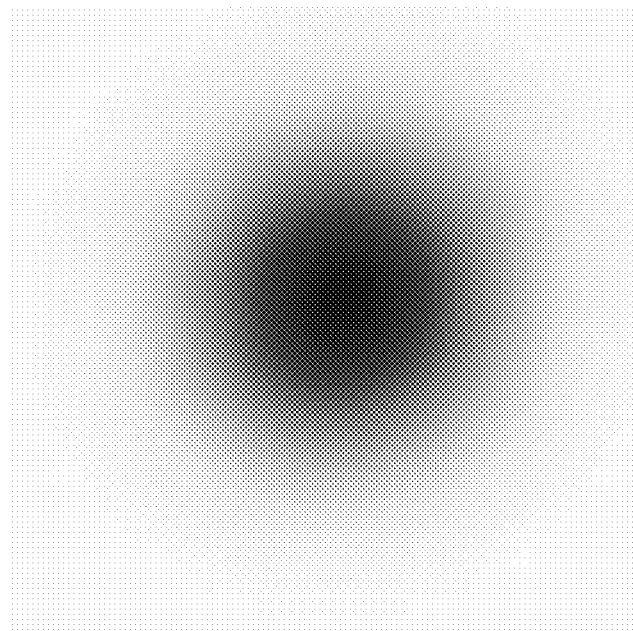
FIG. 3 shows the position uncertainty model of a UAV.

Uncertainty in the flight of the UAV 130 can be modeled using (approximated) probabilistic methods. This invention only considers the case that the GPS uncertainty incurs the position uncertainty. In civil field, GPS systems have a horizontal accuracy of five to ten meters of ninety-five percent confidence, and the vertical accuracy achieves approximately 1.4 times the horizontal accuracy. Although the GPS error is small, the accumulated position uncertainty can be much greater. Therefore, a simple bivariate Gaussian model, denoted by $p \sim N(\mu_x, \mu_y, \sigma_x^2, \sigma_y^2, 0)$, is utilized in this invention to model the GPS isotropic error, where p denotes the two-dimensional Gaussian distribution function, $\mu_x$ and $\mu_y$ are the coordinates of the center position of the UAV 130, $\sigma_x^2$ and $\sigma_y^2$ are the variances in the direction of the coordinate axes. The distribution is shown in FIG. 3.

Under the above assumption, this invention constructs the static safety index map 105 in the following way.

Figure 4:
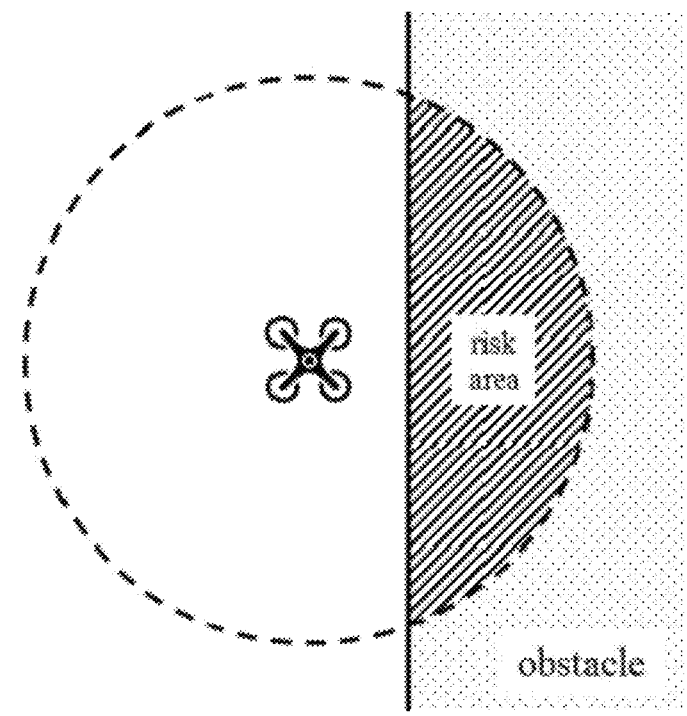
FIG. 4 shows the UAV risk area.

Definition 4. Risk Probability, Pr. Given bivariate position uncertainty model $P(x_c, y_c)$, $(x_c, y_c)$ represents the coordinate of a UAV 130 located at the center point of its position uncertainty model (refer to FIG. 3), the UAV 130 risk probability, $Pr(x_c, y_c)$, refers to the probability that the UAV 130 will hit obstacles due to the GPS positioning error. Therefore, $Pr(x_c, y_c)$ can be calculated by the integral of the position probability density $P(x_c, y_c)$ on the obstacle area, i.e., the integral of the position probability density on the risk area shown in FIG. 4.

According to Definition 4, this invention will calculate the safety probability of the center point of the UAV 130 using this form $\overline{Pr}(x_c, y_c) = 1 - Pr(x_c, y_c)$.

Definition 5. Static safety index map 105. Given a space graph G=(N,A,c), the static SIM describes the UAV 130 flight safety index at an arbitrary point on the space graph, which can be denoted by $$I_1(\vec{s}_c) = -10 \log_{10}(\overline{Pr}(x_c, y_c))$$

where, $I_1(\vec{s}_c)$ denotes the safety index of the UAV 130 located at $\vec{s}_c = (x_c, y_c)$.

The safety index of a path refers to the sum of the safety indices for all points on the path. Higher safety index means a more dangerous path, that is, the safety index is negatively correlated with the safety level.

Next, this invention will describe the process of constructing a static safety index map 105.

Step 1: given a geographic map 102, denoted by MAP∈$R^{M\times N}$ set two-dimensional Gaussian distribution variances, $\sigma_x$ and $\sigma_y$, of the UAV 130 GPS positioning error, let the Gaussian distribution function confidence radius R=3 max$\{\sigma_x,\sigma_y\}$ and the covariance matrix $$cov = \begin{bmatrix} \sigma_x^2 & 0 \\ 0 & \sigma_y^2 \end{bmatrix},$$

and initialize an S-SIMap. S-SIMap is a zero matrix that has the same size as the Map.

Step 2: for a point in the MAP, determine whether the point is in an obstacle area iteratively. If not, let the position probability of point be 1, i.e., P[point]=1. Calculate probability P(ds), where P(ds) denotes the GPS positioning error that locates ds at the point, and ds is an arbitrary point in the circle with the point as the center and R as the radius. Update the position probability P[point], i.e., P[point], P[point]-P(ds). Next, calculate the safety index of the point according to the final P[point], and update the value of the point on the S-SIMap.

The Second Step: Construct a Multiobjective Static Cost Distribution Map 106.

The second step is also conducted in a computer module 104 of the ground module 101. The block 106 constructs a cost distribution map based on the data collected from the block 105. The UAV 130 path planning in a complex low altitude urban environment is constrained by a set of internal constraints (e.g., arrival time, energy consumption, turning radius) and external constraints (e.g., other UAVs, high-rises, birds, high power lines and helikites). For the sake of mission scenario, two major decision objectives, the safety and travel time, are considered in this invention.

1) Safety: The safety objective is modelled with a criterion for collision avoidance. The collision avoidance criterion needs a separation distance from the obstacles. Furthermore, there is uncertainty in the position, velocity, and direction of dynamic obstacles because of sensor error. Such uncertainty may increase the risk of collision. Therefore, it is essential to maintain a certain safe distance with the obstacles, in general, a greater distance may lead to higher safety level.

2) Travel time: The mission plan also needs to optimize one crucial objective of the mission itself, i.e., the travelling time. The travel time is typically restricted by the cruise velocity, flight trajectory, and so on.

Therefore, this invention formulates a multi-objective optimization problem with two objectives: travel time and safety. The solution to this problem is to find an optimal path p between the starting point and end point in a graph G=(N,A,c). Each parameter i in A has two non-negative costs denoted by $c_{i,1}$ and $c_{i,2}$, which represent the travel time and safety respectively. Let $g_j(p)$ be the total cost of the j-th objective for a path p. Let $\vec{g}(p)=(g_1(p),g_2(p))$ be the cost vector for the path p. Therefore, when compared with any other path q the "optimal" path p should meet the following conditions:

$$\forall j\in\{1,2\}, g_j(p)\leq g_j(q) \text{ and } \exists i\in\{1,2\} g_i(p)\leq g_i(q)$$

Solutions that are non-dominated by any other solutions are the Pareto optimal solutions, denoted by a Pareto set P, where P contains a set of Pareto paths. Path p is a Pareto optimal path of the Pareto optimal set, which has the minimal total cost W.

$$w = \min_{p\in P}\{\alpha g_1(p) + (1-\alpha)g_2(p)\}$$

where, α can be adjusted according to the actual demand.

For a path segment l∈p, let the cost w from one end point of an arc to the other be w=αI(l)+(1−α)t, where t represents the flight time, I(l) represents the safety index of the path segment l. In this invention, we define a new speed function $V^*(\vec{s})$ as $$V^*(\vec{s}) = \frac{V(\vec{s})}{\alpha I(\vec{s})\cdot V(\vec{s}) + (1-\alpha)}$$

where, $\vec{s}$ denotes the current position of the UAV 130, $V(\vec{s})$ denotes the velocity function of the UAV 130 at $\vec{s}$, and $I(\vec{s})$ represents the safety index of the UAV 130 at $\vec{s}$. The defined speed function indicates when the safety index value is large, i.e., the safety level is low, the wave propagation may slow down, which is reasonable.

Figure 5:
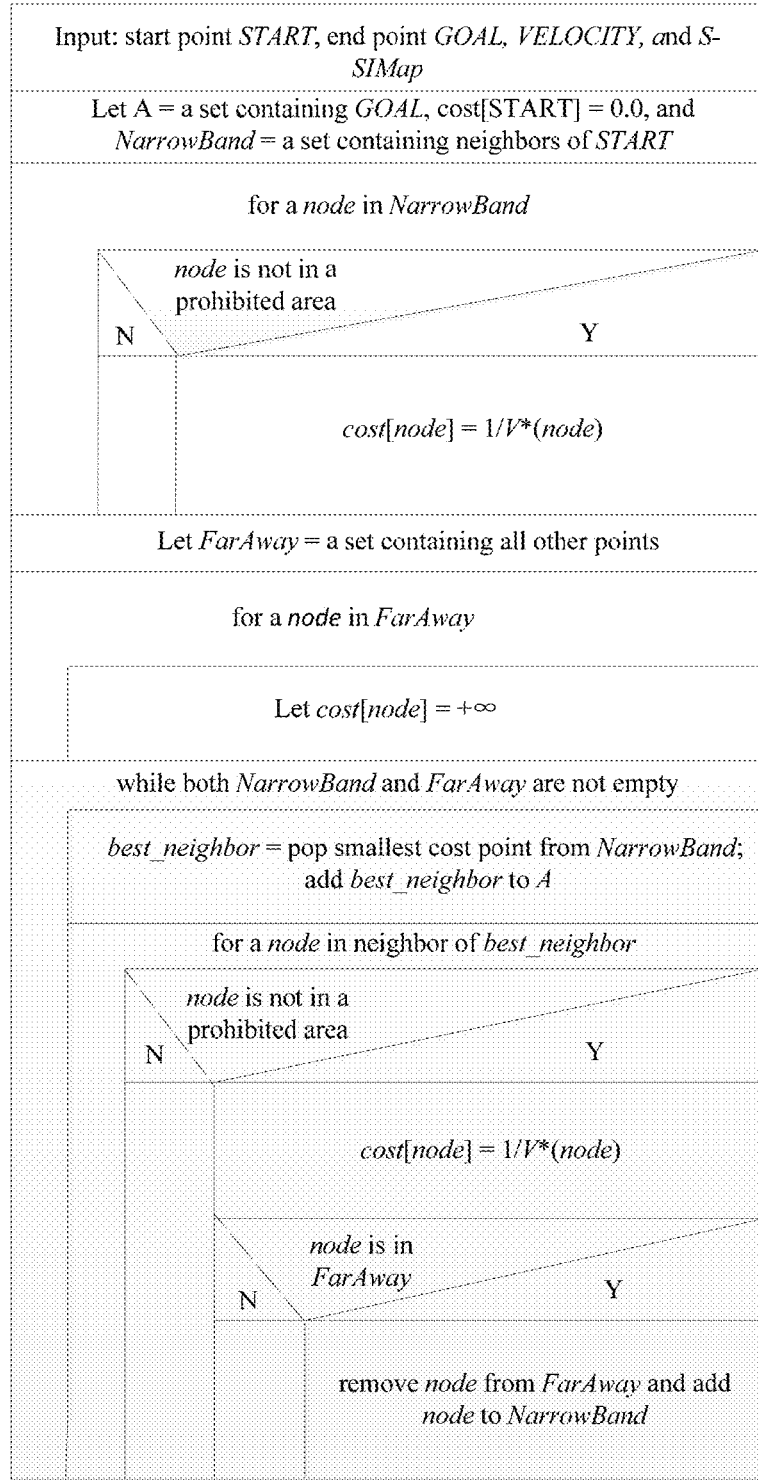
FIG. 5 is a schematic diagram of constructing a static cost distribution map.

According to the above analysis and the flow chart shown in FIG. 5, the detail steps of constructing a static cost distribution map 106 can be summarized as the following:

(a) given a starting point START, an end point GOAL, the velocity of UAV 130 VELOCITY, a static safety index map 105 distribution S-SIMap, and weight coefficient α. Initialize A as a set containing only GOAL, initialize NarrowBand as a set containing neighbors of the START, and initialize FarAway as a set containing all nodes on the S-SIMap except for those in A and NarrowBand. Let COST∈$R^{M\times N}$ be a zero matrix;

(b) for a node in NarrowBand, determining whether the node is in a prohibited area iteratively, where the prohibited area denotes a known static obstacle area; if not, setting COST[node]=distance_between(node, GOAL)*(αS-SIMap[node]*VELOCITY+(1−α))/VELOCITY, where S-SIMap[node] represents the safety index at the node on the S-SIMap, and distance_between (node, GOAL) represents the Euclidean distance between node and GOAL;

(c) for every node in FarAway, let COST[node]=+∞;

(d) determining whether NarrowBand and FarAway are empty iteratively, and if both NarrowBand and FarAway are not empty, then performing (1.1); otherwise, terminating iteration and output COST as the static cost distribution map 106;

(1.1) record the least cost node in the NarrowBand as best_neighbor, and add the best_neighbor to A. Meanwhile, determine iteratively whether a neighbor node of best_neighbor is in a prohibited area. If yes, continue to determine; otherwise, update the cost at node, i.e., COST[node]= distance_between(node, best_neighbor)*(αS-SIMap[node]*VELOCITY+(1−α))/VELOCITY. Continually, determine whether the neighbor node is in FarAway. If yes, remove node from FarAway and add node to NarrowBand; otherwise, do nothing.

The Third Step: Offline Search Algorithm (OFSA) 107

The OFSA 107 carries the similar spirit as the level set method initially designed by Osher and Sethian, i.e., move wave front to match the individual parameter family. The offline search process of the invention is based on a static cost distribution map 106. The process is to plan offline an intact flight path from a starting point to an end point for a UAV 130. In accordance with this flight path, a UAV 130 can not only avoid static obstacles but also quickly reach the destination. Offline search 107 includes the following two steps:

(a) given a starting point START, an end point GOAL, a static cost distribution map 106, COST. Letting a point current equals to the START point of a UAV 130, initialize the path as a queue containing only the point, current.

(b) determining whether current equals to GOAL iteratively. If not, determining whether current has neighbor nodes. If not, then return failure; if yes, then update current by the least cost neighbor of the current, and add the updated current to the end of the path. The point at the end of the path becomes the current point. The decision process will not be terminated until the current equals to GOAL. After the decision process is terminated, return path.

The above described three steps are conducted in a computer module 104 of the ground module 101.

The offline path planning module is responsible for planning an offline path for the UAV before it takes off and writes the offline path to the storage module. The role of the ground station is to communication with the UAV. For example, the ground station would send control information to the UAV and accept UAV status information from the UAV.

Online path planning module includes a communication module and a path replanning module. The communication module is used to communication with the ground station and is reserved as an operator interface to accept control and management from the ground station. Upon the path replanning module receiving a path-planning-decision from the detect module, the path replanning module either keeps flying on the old offline-path or begins planning a new path online until the UAV arrives at a target area. The online path planning module will pass path maneuver commands to the UAV flight control module. The UAV flight control module is responsible for controlling such critical parameters as height, speed, angle, the attitude of the UAV, and guaranteeing a stable UAV flight.

Similarly, the third step is conducted in a computer module 104 of the ground module 101. After generating the offline path and the COST, these data are stored in the storage module 114 onboard the UAV 130.

The Fourth Step: Joint Offline and Online Search Scheme 120

This step is conducted on the UAV. The goal of this scheme is to obtain an optimal UAV 130 flying path. According to the starting point, the end point and flight speed of a UAV 130, this invention utilizes offline search scheme 107 to plan the least cost path for the UAV 130 from the starting point to the end point. During the flight, when unexpected obstacles are detected, the online search scheme 121 is activated to replan a changed path to avoid dynamic obstacles.

Figure 6:
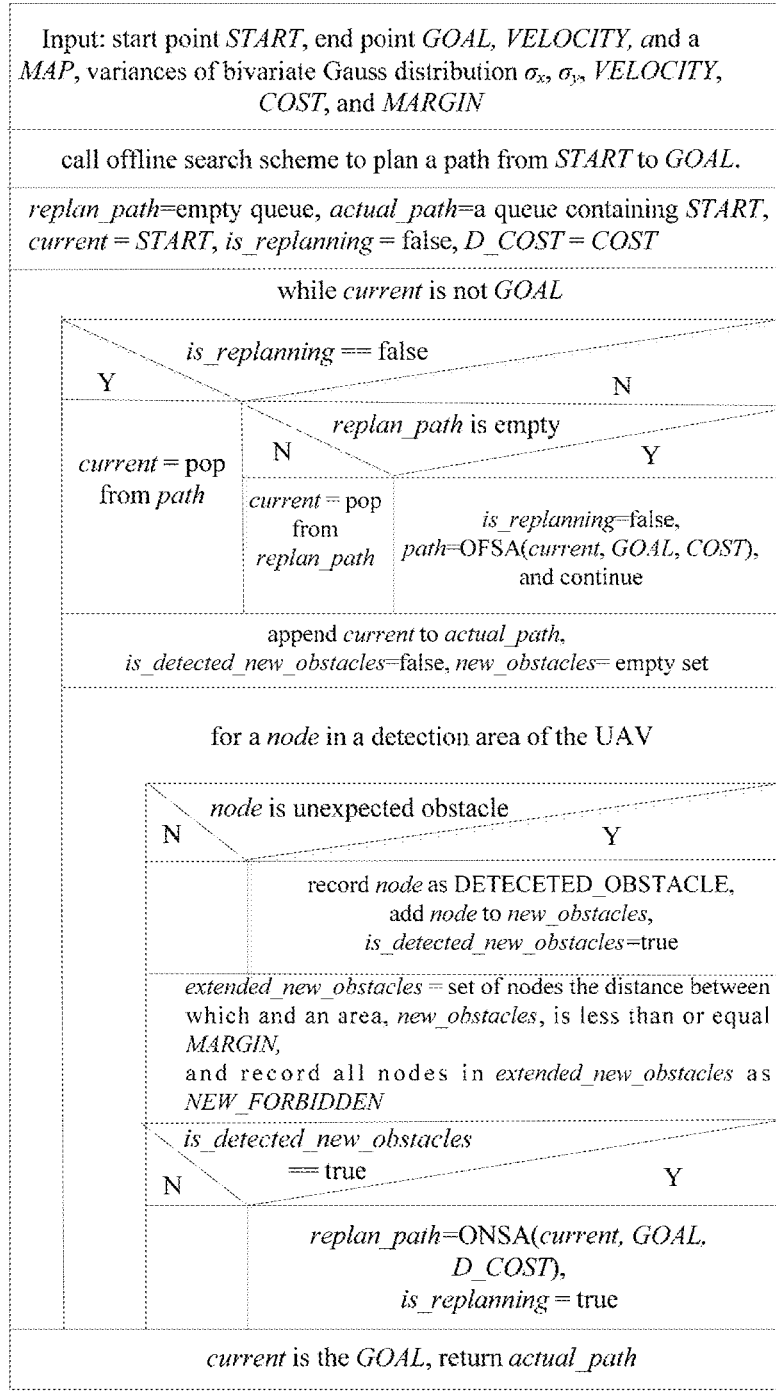
FIG. 6 shows the process of solving the multiobjective path planning problem.

Combined with FIGS. 2 and 6, the process of the joint offline and online search scheme 120 proposed in this invention can be summarized as the following:

Step 1: refer to block 136, given a starting point START, an end point GOAL, a static cost distribution map 106 COST, which can be read from the onboard storage block 114 through the I/O block 117. Let both path and replan_path be empty queues, initialize the actual_path as a queue containing only the START, let the variable current equal to START, and let a flag is_replanning equal to false. Let a dynamic cost distribution map 131 D_COST=COST.

Step 2: go to block 122 to determine whether current is GOAL. If not, go to block 124; otherwise, refer to block 123 to return actual_path.

Step 3: in block 124, determine whether is_replanning is false. If yes, then go to block 126 to pop an item from the path, assign the item to current, and go to step 5; otherwise, refer to block 125.

Step 4: in block 125, determine whether the queue replan_path is empty. If not, then go to block 127 to pop an item from replan_path, assign the item to current, and go to step 5; otherwise, let is_replanning be false, and call the offline search scheme 107 to plan a path from current to GOAL, i.e., path=OFSA(current, GOAL, COST), and return to block 122.

Step 5: add current to the end of the queue actual_path; let a decision flag 116, denoted by is_detected_new_obstacles be false, and set new_obstacles be an empty set. Pass is_detected_new_obstacles 116 and new_obstacles to block 128.

Step 6: in block 128, run the obstacle detection module 110 to detect whether there are unexpected obstacles in the detection range of the UAV 130 and output the obstacle-detection flag is_detected_new_obstacles 116 and a queue new_obstacles.

Step 7: if is_detected_new_obstacles=true, i.e., unexpected obstacles are detected, then call a dynamic safety index map 129 generation scheme to generate a dynamic safety index map 129 D-SIMap; and call a dynamic cost distribution map 131 update scheme to update the dynamic cost distribution map 131 D_COST based on the D-SIMap; next, call the online search scheme 121 to plan a path from current to GOAL based on the D_COST, i.e., replan_path=ONSA(current, GOAL, D_COST); and let the flag is_replanning=true; otherwise, return to block 122.

Moreover, the joint offline and online search module 120 will achieve the current location of the UAV 130 from GPS POSITIONING module 133 and pass path maneuver commands 132 to the UAV flight control module 134. The UAV flight control module 134 is responsible for controlling such critical parameters as height, speed, angle, the attitude of the UAV 130, and guaranteeing a stable UAV 130 flight. Besides, there is a communication module 135 onboard the UAV 130. This module 135 is used to communication with ground station 103 and is reserved as an operator interface to accept vehicle & payload commands 108 from the ground station 103 or transmit the vehicle status information 109 to the ground station 103 through downlink communication.

Next, we will discuss how to design the obstacle detection module 110, the dynamic safety index map 129 generation scheme, and dynamic cost distribution map 131 update scheme, respectively.

(1): design an obstacle detection module 110.

The process of designing this detection module 110 is presented as the following:

(a) given a dynamic cost distribution map 131 D_COST, the flag is_detected_new_obstacles 116, and a set new_obstacles;

(b) determining iteratively whether a node that is in the detection range of a UAV 130 located at the position of the current is an unknown obstacle by checking the value of COST[node], wherein the current location of the UAV 130 is current. If yes, add node to new_obstacles, and set is_detected_new_obstacles 116 to be true; otherwise, continue to determine. This decision process will not be terminated until all nodes in the detection range of the UAV 130 are determined. After the decision process is terminated, return is_detected_new_obstacles 116 and new_obstacles.

The obstacle detection module 110 includes a distance sensors module 111, a storage module 114, a safety margin module 112, and a detect decision module 113. Meanwhile, a GPS POSITIONING module 133 can provide the location of UAV 130 for the obstacle detection module 110. The distance sensors module 111 on board the UAV is used to measure the distance between the UAV 130 and obstacles. Meanwhile, it will deliver sensing data 115 to the detect decision module 113 for making a decision. Examples of sensors available on board the UAV 130 are ultrasonic radar, infrared radar, and optical sensors. Moreover, the sensing range of the sensor module may be various. The storage module 114 stores the offline path and the value of COST, which are generated on the ground 101. The detect decision module 116 makes decisions based on integrated information that is provided by the distance sensors module 111, safety margin module 112, GPS POSITIONING module 133, and storage module 114.

(2): construct a dynamic safety index map 129, D-SIMap.

Since the computational complexity of generating a static safety index map 105 is relatively high, it is not suitable for the online generation. This invention proposes to construct a D-SIMap to solve this problem. D-SIMap is used to describe unexpected obstacles and dangerous areas on the geographic map 102.

Set the detection range of a UAV 130. During a flight, the UAV 130 will detect the surrounding environment to obtain necessary information. The invention models the detection range of the UAV 130 as a circle with the current position of the UAV 130 being the center and airborne sensor detection distance R being the radius.

If a UAV 130 detects an unknown obstacle that is not marked on the geographic map 102, it marks the unknown obstacle as a "new obstacle" and uses the following mechanism to construct a D-SIMap.

Definition 6: safety margin 112. When a UAV 130 finds an unexpected obstacle in its detection range, one of the obstacle avoidance measures that the UAV 130 can take is emergency braking. The emergency braking mechanism is associated with the speed of the UAV 130. We call the braking distance "safety margin" 112, denoted by $d_{sm}$.

Next, this invention utilizes the following formation to construct the D-SIMap of unexpected obstacles $$D - SIMap(\vec{s}_c) = \begin{cases} +\infty & d_c \leq d_{sm} \\ 0 & \text{else} \end{cases}$$

where, $D\text{-}SIMap(\vec{s}_c)$ denotes the safety index of the UAV 130 located at $\vec{s}_c$, $d_c$, represents the horizontal distance between the UAV 130 and the unexpected obstacle.

According to the above analysis, the process of constructing a dynamic safety index map 129, D-SIMap, can be presented as the following:

(a) let $D\text{-}SIMap \in R^{M \times N}$ be a zero matrix. Set the sensing radius of the airborne sensor be R, and set the safety margin 112 be $d_{sm}$.

(b) for each point in the detection range of the UAV 130 located at the position of the current, calculate distance, $d_c$, between the point and the unexpected obstacle detected by the UAV 130. Compare $d_c$ with $d_{sm}$. If $d_c \leq d_{sm}$, update the safety index of point, i.e., let D-SIMap[point]=+∞; otherwise, do not update D-SIMap[point].

(2) Dynamic Cost Distribution Map 131 Update Scheme.

Since the generation process of a dynamic cost distribution map 131 is as same as that of the static cost distribution map 106, when the S-SIMap in the static cost distribution map 106 generation process is replaced by a D-SIMap, a dynamic cost map is obtained.

Therefore, the updating process of a dynamic cost distribution map 131 D_COST comprises the following steps:

(a) given a dynamic cost distribution map 131 D_COST, a dynamic safety index map 129 D-SIMap, the velocity of UAV 130 VELOCITY, and weight coefficient α.

(b) for each node in the detection range of the UAV 130 located at the position of the current, calculate D_COST [node]=distance_between(node, GOAL)*(αD-SIMap[node] *VELOCITY+(1−α))/VELOCITY. Mark the node with D_COST[node]=+∞ as NEW_FORBIDDEN. After D_COST values of all nodes in the detection range of the UAV 130 are updated, return D_COST and NEW_FORBIDDEN.

(3): Online Search (ONSA) 121.

ONSA 121 is based on a dynamic cost distribution map 131. It is utilized to online plan a changed path for a UAV 130. According to this changed path, the UAV 130 can quickly avoid dynamic obstacles.

ONSA 121 shares the similar inspiration as the A* algorithm. However, ONSA 121 may exist the following two differences: 1) it leverages the knowledge provided by the above OFSA 107 to guide the search direction rather than adopt the traditional Euclidean distance or Manhattan distance in the A* algorithm. 2) a search space cut down mechanism is exploited in ONSA 121 to accelerate the search efficiency.

The ONSA 121 utilizes a cost heuristic function $f(\vec{s})$ to guide the search, which can take the form $$f(\vec{s})=g(\vec{s})+h(\vec{s})$$

where, $g(\vec{s})$ is the path cost from the starting point to the current point, $h(\vec{s})$ denotes an admissible heuristic estimation of the path cost from the current point to the end point, and $\vec{s}$ represents the current position of a UAV 130. For A* algorithm, it uses Euclidean distance or Manhattan distance to represent $h(\vec{s})$, because it is the smallest possible cost in physical between any two points. However, since OFSA 107 can generate the Pareto optimal paths for all other points on the space graph moving toward an end point of a UAV 130, this invention assigns straightforwardly the Pareto optimal path information to represent $h(\vec{s})$.

It is known that the computational complexity of the A* algorithm is O(N log N), where, N denotes the number of nodes on the geography map. Obviously, when N is large enough (e.g., the size of the map is large, or the resolution of the map is high), and the starting point is far from the end point, the executing time of the A* algorithm may be long, and it may not meet with the real-time requirement.

This invention proposes a search-space-cut-down mechanism. Specifically, when the straight path between the current point and the end point does not appear in a dynamic threat area generated by unexpected obstacles, then the online search process is terminated. Thus, when the end point is far from the starting point the search space is drastically reduced, and the execution efficiency of ONSA 121 is significantly enhanced.

Figure 7:
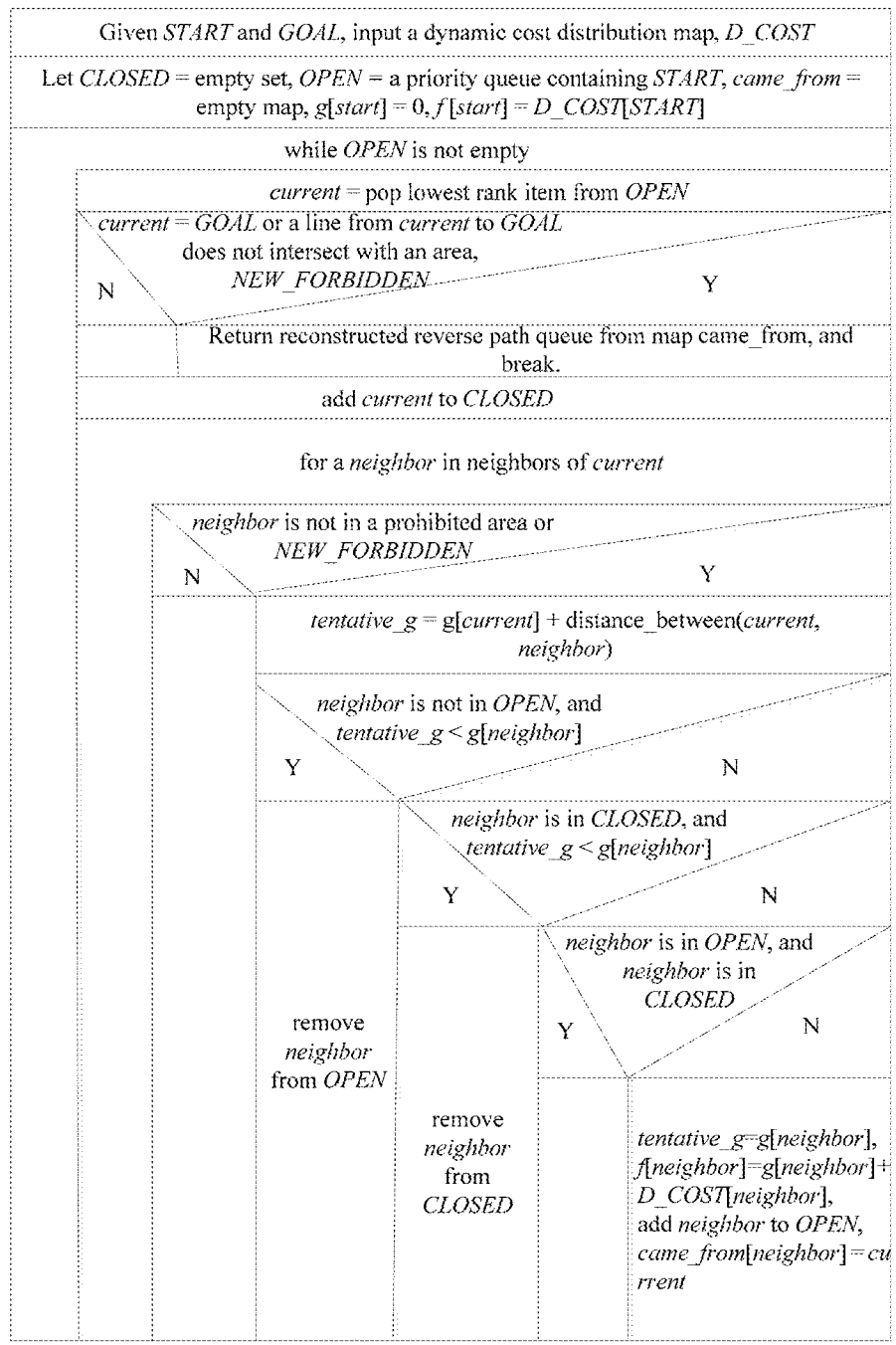
FIG. 7 shows the online search process.

Combined with FIG. 7, the process of ONSA 121 can be summarized as the following:

(1) given a starting point START, an end point GOAL, a dynamic cost distribution map 131 D_COST, FORBID- DEN, and NEW_FORBIDDEN. Let CLOSED, path costs g and ƒ be empty sets, let OPEN denote a priority queue containing the START, and let came_from be an empty map. Set a path cost g[start] be 0, let a cost heuristic function ƒ [start] equal D_COST[START], and let tentative_g=0. Let replan_path be an empty queue.

(2) determining whether OPEN is empty, if OPEN is not empty, popping the lowest rank point from OPEN and assign the point to current. Then, execute the following (2.1)-(2.3); if OPEN is empty, then stop and return failure.

(2.1) if current equals to GOAL or a line from current to GOAL does not intersect with an area marked as NEW_FORBIDDEN, then return the reconstructed reverse path queue replan_path from came_from and stop; otherwise, add current to CLOSED and continue.

(2.2) determining whether a neighbor of current is in FORBIDDEN or NEW_FORBIDDEN. If not, then update estimated path cost tentative_g by the sum of g[current] and the Euclidean distance between current and neighbor. Next, call (2.3).

(2.3) determining whether neighbor is in OPEN and whether tentative_g is smaller than g[neighbor]. If both conditions are met, then remove neighbor from OPEN; otherwise, call (2.4).

(2.4) determining whether neighbor is in CLOSED and whether tentative_g is smaller than g[neighbor]. If both conditions are met, then remove neighbor from CLOSED; otherwise, call (2.5).

(2.5) determining whether neighbor is in OPEN, and neighbor is in CLOSED. If both not, then assign tentative_g to g[neighbor], and update ƒ [neighbor] by summing up g[neighbor] and D_COST[neighbor]. Meanwhile, add neighbor to OPEN, and let came_from[neighbor] equal current.

(2.6) determining whether current has remaining neighbor nodes, if yes, call (2.2); otherwise, call (2) and continue to determine whether OPEN is empty.

Note that the ONSA 121 is not limited to the above-described steps (1)-(2). As long as the requirements of the online search 121 are met, the mechanism for restricting the search space is used in the search process, and the cost heuristic function is used to guide the search, then the realization steps that do not need to pay for efforts also belongs to the scope of the invention.

Here is an example of solving a path planning problem using the method proposed in this invention.

Figure 8:
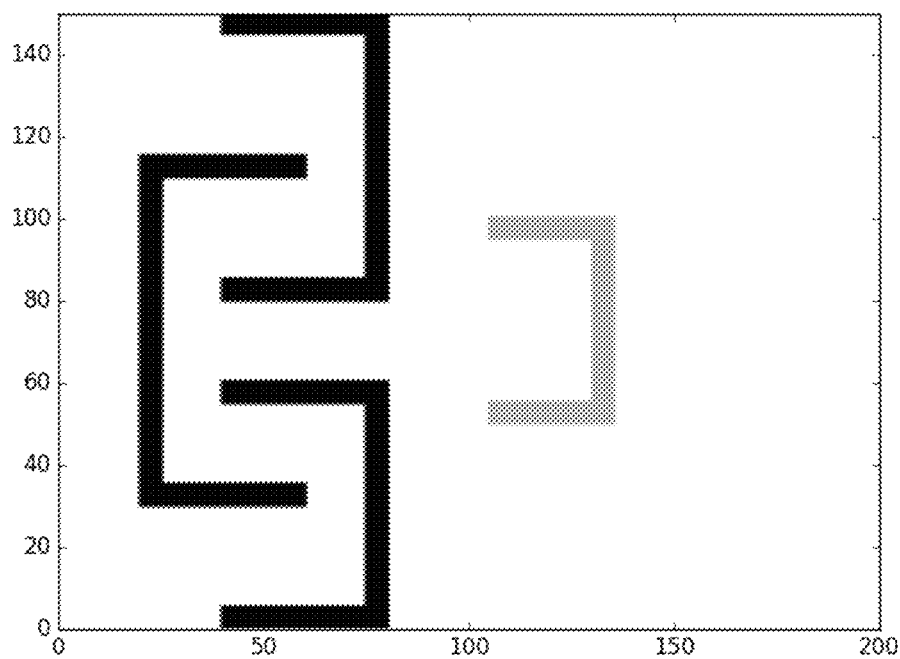
FIG. 8 shows an original map.

FIG. 8 shows an original map, where black parts denote known obstacles marked on the map, gray parts represent unmarked and unexpected obstacles on the map, and white parts denote the free space.

Figure 9:
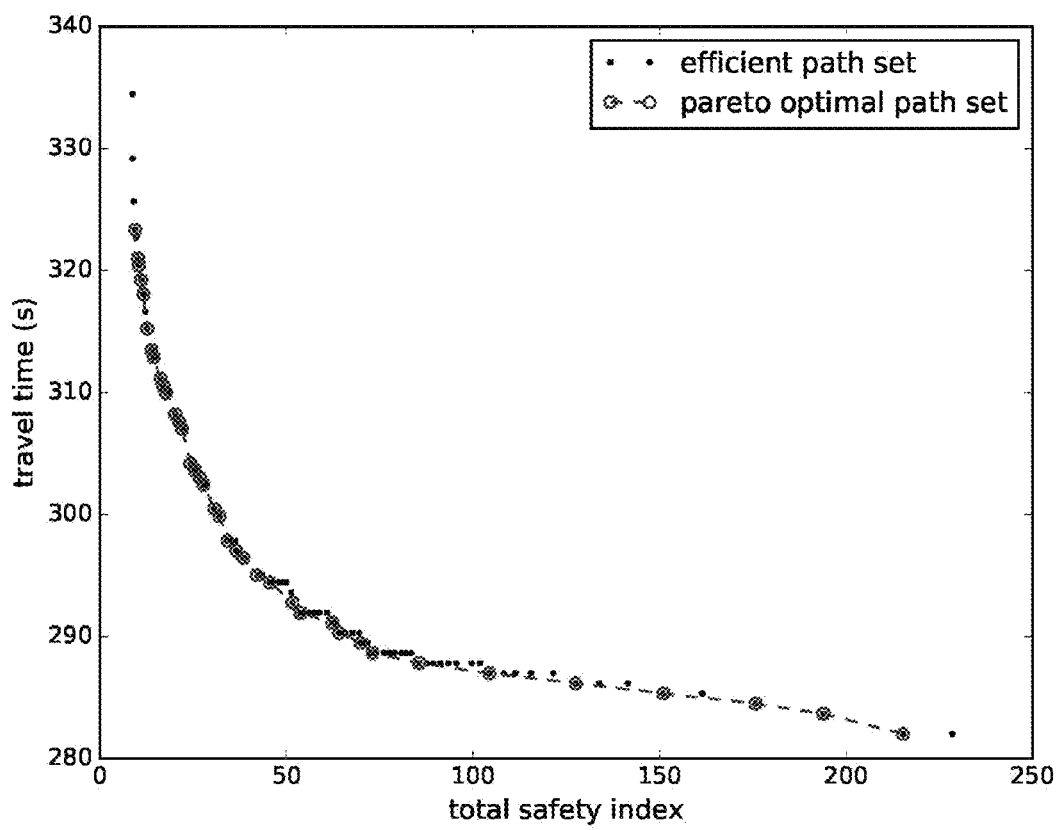
FIG. 9 shows the expected flight time—path safety exponential curve corresponding to the map shown in FIG. 8.

FIG. 9 shows a set of Pareto optimal solutions of the multiobjective path planning under the map shown in FIG. 8, where black dots represent an available path set and black circle points represent a Pareto optimal path set. From FIG. 9 we can have the following observations:

1) Short flight time corresponds to large safety index or low safety level. These two objectives are contradictory.
2) There is no path with the minimum flight time and minimum safety index or maximum safe level in the result.
3) Users can choose their path from the Pareto optimal path set (the corresponding path of the black circle) according to their actual requirements.

Figure 10:
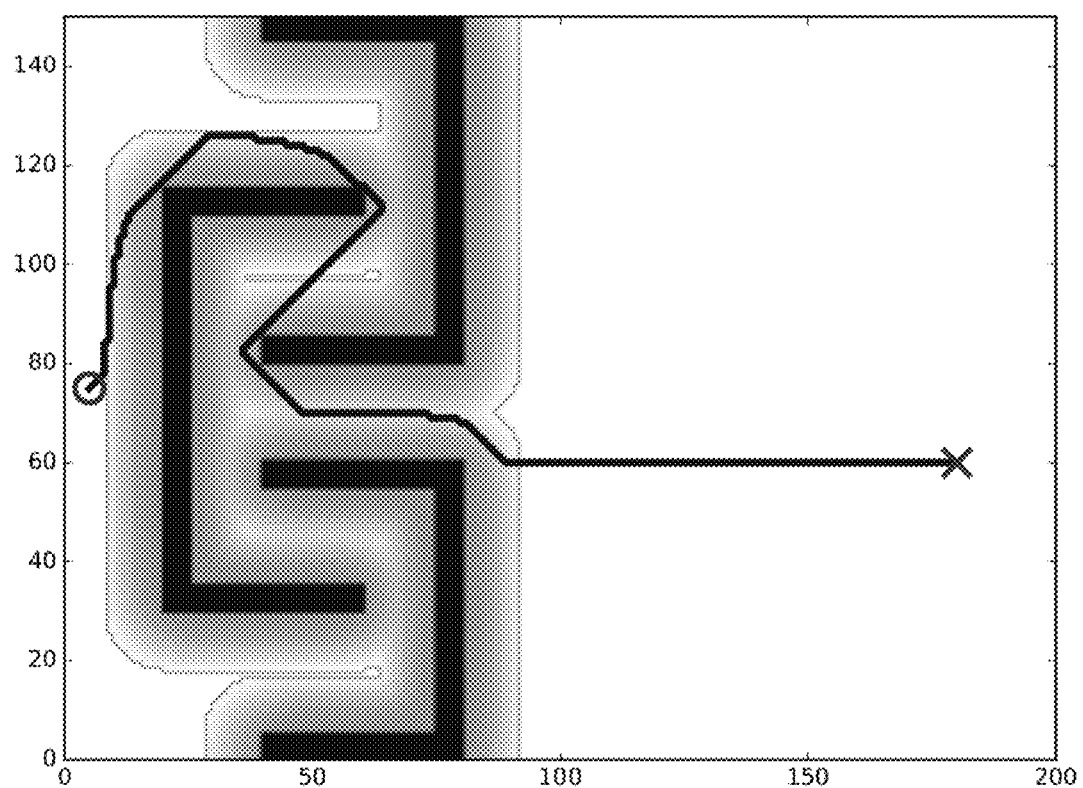
FIG. 10 shows a flight path with an estimated flight time of 296.5 seconds and a safety index of 38.

FIG. 10 shows a path. The total safety index of the path is 38, and its travel time equals 296.5 s. The darkness of the color in the gray area represents the value of the safety index. Darker color represents higher safety index or lower safety level. Besides, in FIG. 10, "0" is the starting point, "X" is the end point, and the curve is the planned path.

Figure 11:
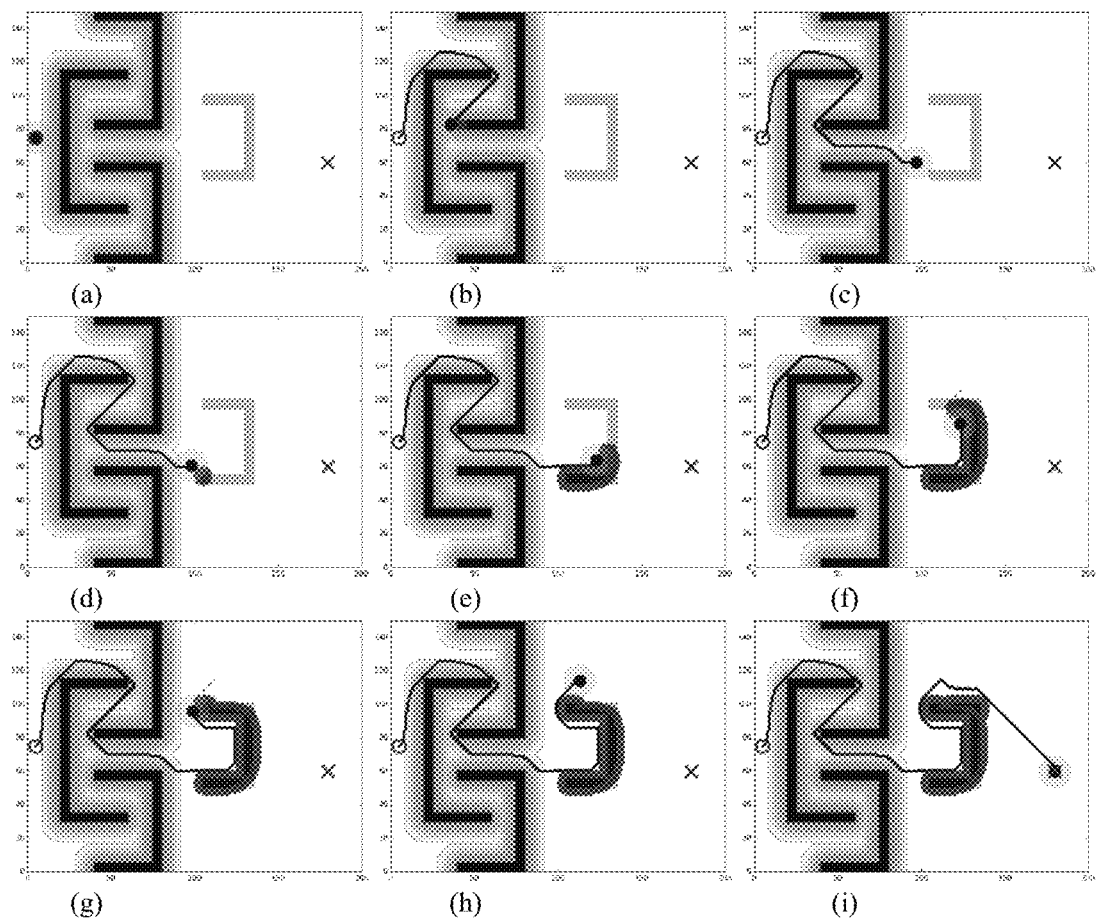
FIG. 11 shows the flight path of the UAV when the detection range is 10 meters.
Figure 12:
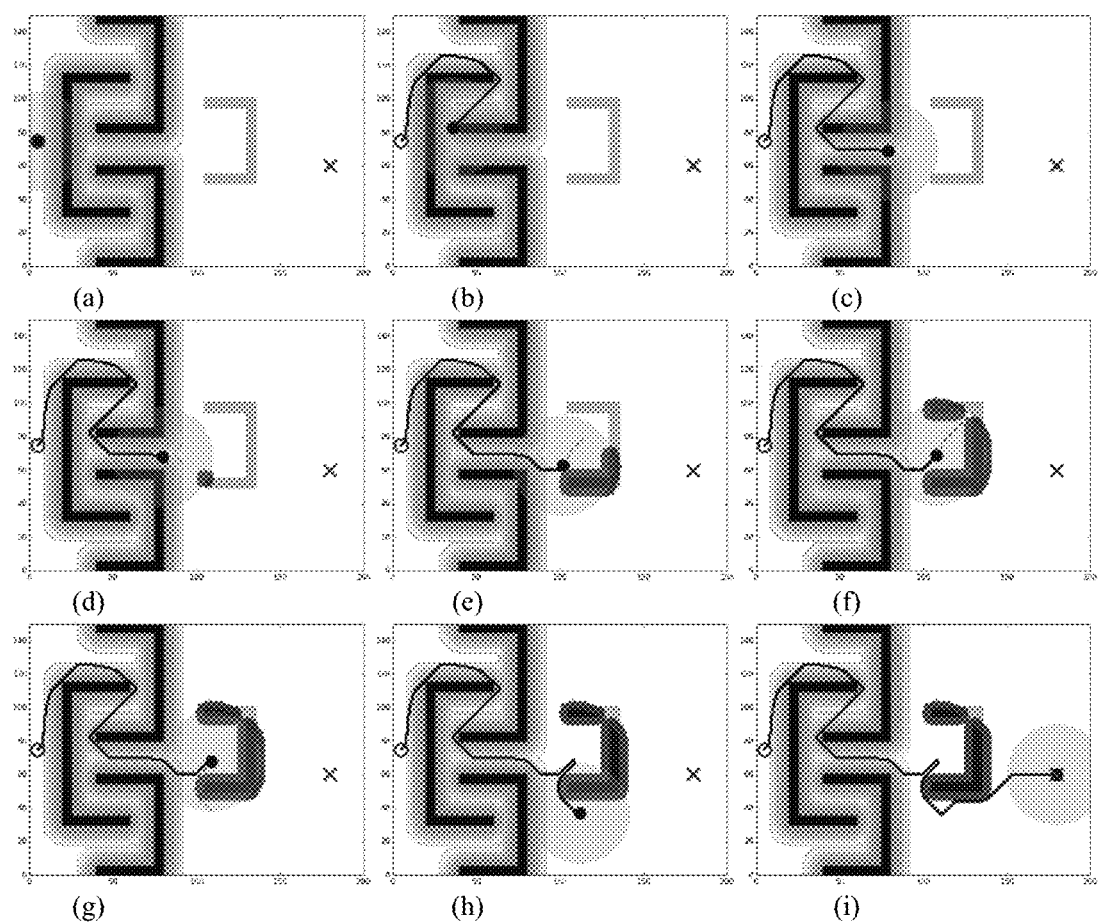
FIG. 12 shows the flight path of the UAV when the detection range is 30 meters.

FIG. 11 and FIG. 12 show the results of the online search under different detection ranges. Similarly, in FIGS. 11 and 12, the depth of the color in the gray area represents the value of the safety index. Darker color corresponds to higher safety index or lower security level. "0" is the starting point, "X" is the end point, and the black curve is the planned path. The black dot indicates the current position of the UAV 130. There is a light gray disc around it. The disc indicates the detection range of the UAV 130. The dotted lines in (e), (f), (g) describe the replanning results of the online search. The black area represents detected unexpected obstacles, and the dark gray area represents the safety margin 112 area of detected unexpected obstacles. The following observations may be obtained from these figures:

1) Larger detection range can help the UAV avoid unexpected obstacles in a better manner.
2) Dotted lines in all graphs are short. It indicates that the search range of online search is small and the running time of the algorithm is short. Table 1 shows the average time-consuming and maximum time-consuming for online search under two detection ranges.

TABLE 1

Running time of ONSA 121

| Detection range | Average time-consuming | maximum time-consuming |
|---|---|---|
| 10 m | 0.1588 us | 0.5998 us |
| 30 m | 0.1333 us | 0.6227 us |

As can be seen from Table 1, the greater the detection range of a UAV 130, the less time required for the online search.

Figure 13:
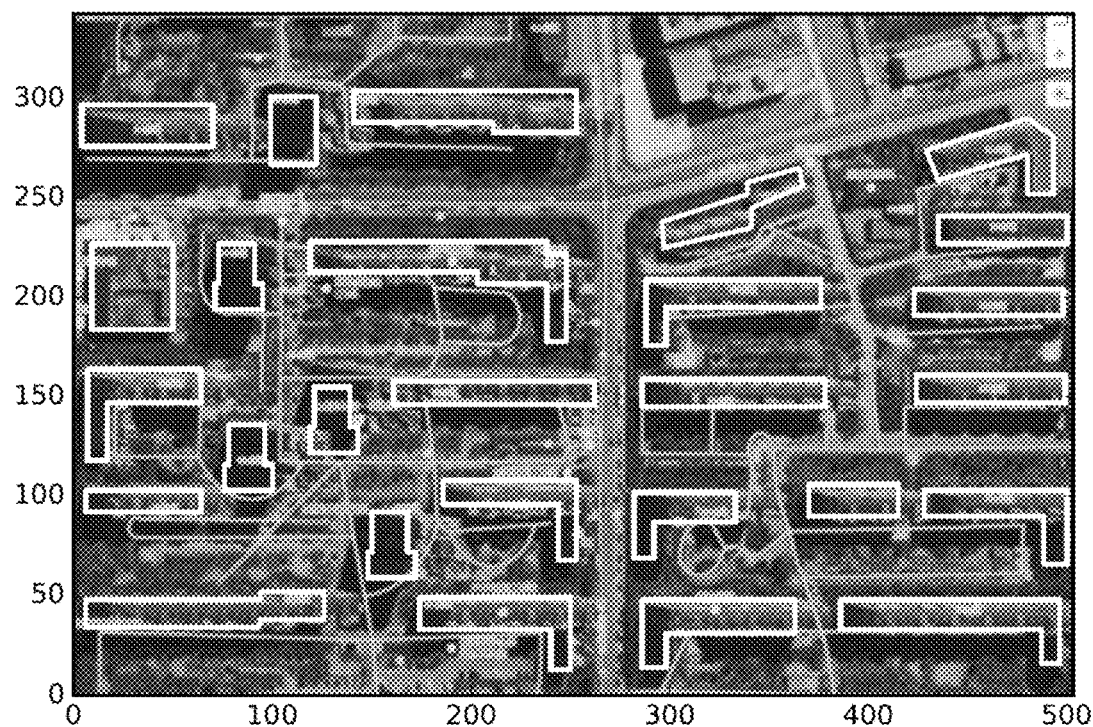
FIG. 13 shows a schematic diagram of realistic urban buildings.

Meanwhile, this invention chooses a realistic scenario shown in FIG. 13 to further measure the effectiveness of the proposed MOPP. FIG. 13 shows the Satellite Map of Tiantong-zhongyuan west, Changping District, Beijing (N40° 04', E116° 25'). This invention divides the map into disjointed lattices with the resolution of 1:1.13 m. Outlines of all buildings are extracted and marked with white lines. Besides, the initial coordinate of the UAV 130 is ($495^{th}$ lattice, $310^{th}$ lattice) and the coordinate of the target is ($30^{th}$ lattice, $140^{th}$ lattice).

Figure 14:
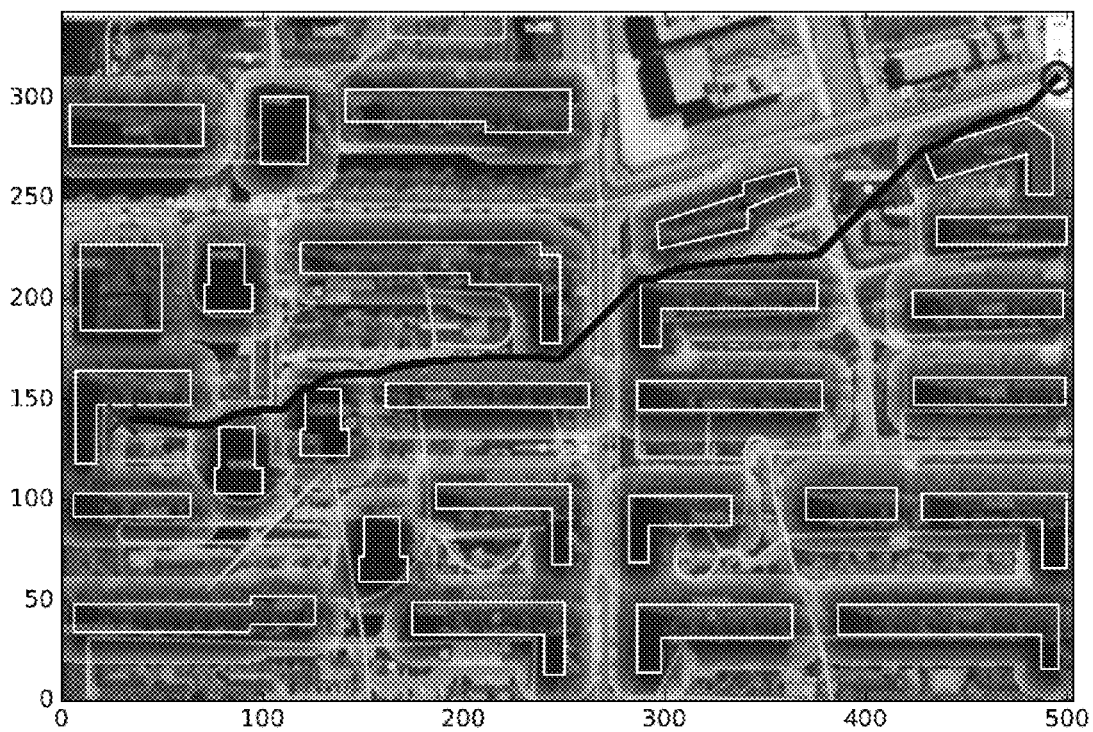
FIG. 14 shows a UAV path with weight coefficient $\alpha=0.89$.
Figure 15:
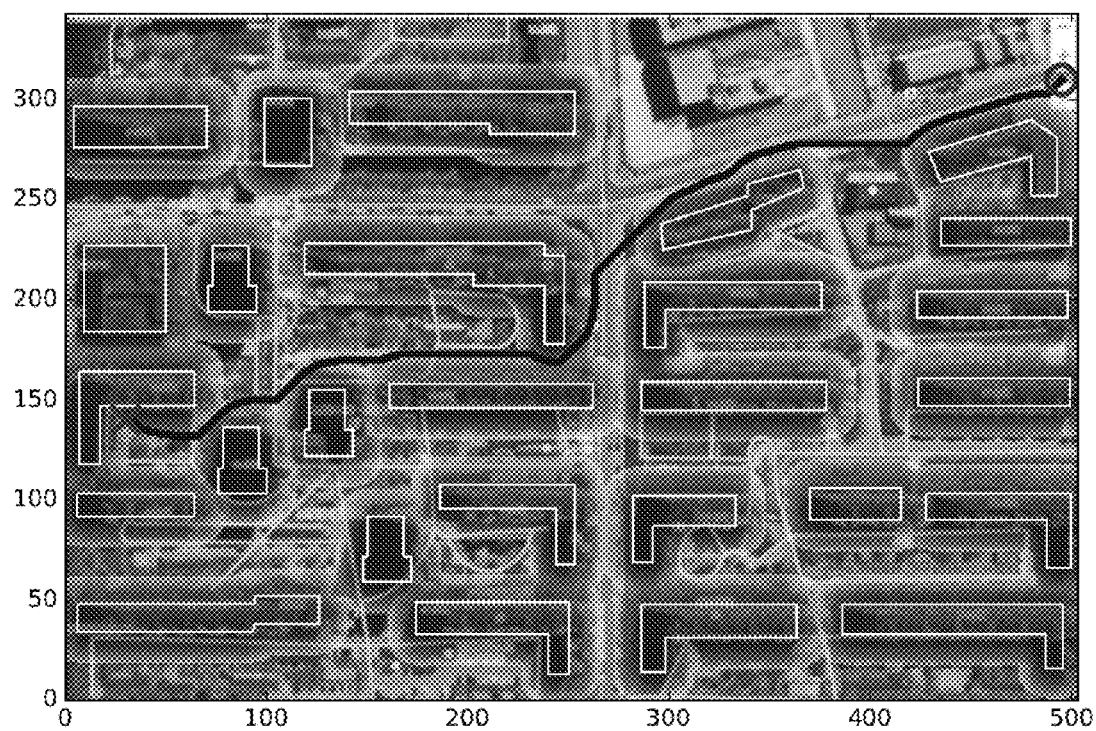
FIG. 15 shows a UAV path with weight coefficient $\alpha=0.22$.

FIGS. 14 and 15 depict UAV 130 trajectories under different weight coefficients α. In FIG. 14, the weight coefficient α=0.89, the total safety index of the obtained UAV 130 trajectory equals thirteen and its travel time equals 79.9 s. In FIG. 15, the weight coefficient α=0.22, the total safety index of the obtained UAV 130 trajectory is seventy-four and its corresponding travel time is 76.6 s. The following observations may be obtained from these two figures:

1) MOPP provides a path planning tool for users to make route decision regarding their preferences. When a safe path with constrained arriving time (e.g., 80s) is preferred for a user. The user can select the UAV 130 trajectory shown in FIG. 14. However, if a user prefers a quick path with constrained safety index (e.g., 80), he or she then can choose the UAV 130 trajectory shown in FIG. 15.
2) FIGS. 14 and 15 reflect that when a user prefers a path of high safety level, MOPP may provide a set of Pareto paths that are far away from surfaces of urban buildings and narrow passageways. However, when a user prefers short travel time, MOPP may provide a set of Pareto optimal paths that pass through narrow passageways and turn close to urban buildings.

What is claimed is:

1. A joint search method for multiobjective path planning for an unmanned aerial vehicle (UAV) traveling from a starting point (START) to an end point (GOAL) in an urban low altitude environment, the method comprising the steps of:

(a) constructing a static safety index map (S-SIMap) based on a set of static obstacles (denoted by FORBIDDEN) that are marked on a geographic map containing the starting point and the end point, wherein a lattice of nodes, the nodes each being square, is defined over the geographic map, and the S-SIMap provides a static safety index for the UAV when located at each node in the lattice of nodes, wherein the UAV is deemed located at the node if a center of the UAV is within the node, wherein the static safety index map S-SIMap$\in R^{M \times N}$ the static safety index S-SIMap[$\vec{s}_c$] of the UAV centered at $\vec{s}_c = (x_c, y_c)$ is calculated by S-SIMap[$\vec{s}_c$]=$-10 \log_{10}(\overline{Pr}(x_c,y_c))$, where $\overline{Pr}(x_c,y_c)=1-Pr(x_c,y_c)$, and
$Pr(x_c,y_c)$, representing a risk probability of the UAV centered at $(x_c,y_c)$, is calculated by the integral of the position probability density on an obstacle area;

(b) constructing a static cost distribution map (COST) based on both the S-SIMap and a velocity of the UAV, and storing the COST in a memory module of a computer on board the UAV; copying the COST and setting a dynamic cost distribution map (D_COST) as equal to COST;

(c) performing an offline search (OFSA) using the COST to obtain an offline flight path (path) for the UAV from the START to the GOAL according to path=OFSA (START, GOAL, COST); storing the path in the memory module of the computer on board the UAV, setting a current flight path to the path, and causing the UAV to fly according to the current flight plan and repeatedly perform the steps (d)-(g) until the UAV reaches the end point;

(d) running an obstacle detection module of the UAV to detect whether an obstacle unmarked on the geographic map appears within a detection range of the UAV, and outputting a flag, is_detected_new_obstacles, to indicate whether an online search should be activated, wherein the detection range is a circle centered at a current location, current, of the center of the UAV with a radius equal to an airborne sensor detection distance;

(e) if no unmarked obstacle is detected in step (d), the UAV continuing to fly according to the current flight plan;

(f) if an unmarked obstacle is detected in step (d), the UAV performing an online search (ONSA) for a replanned flight plan, replan_path, and setting the current flight plan to the replanned flight plan, wherein the online search comprises the following substeps:

(f1) constructing in real-time a dynamic safety index map wherein the D-SIMap provides a dynamic safety index for any nodes corresponding to the unmarked obstacle detected;

(f2) formulating a multiobjective path planning problem of joint optimization of flight time and flight safety of the UAV traveling from the current location to the end point;

(f3) updating the D_COST based on the D-SIMap; including some nodes in NEW_FORBIDDEN according to the D_COST;

(f4) solving the multiobjective path planning problem to obtain the replanned flight path based on the D_COST, and setting the current flight path to the replanned flight path;

(f5) terminating the online search if the UAV is at the end point or a straight line between the current location and the end point does not appear in the NEW_FORBIDDEN; otherwise, repeating from step (f1);

(g) after step (f) is terminated, performing an offline search to obtain an offline flight path (path) for the UAV from current to the GOAL based on the stored COST according to path=OFSA(current, GOAL, COST), and setting the current flight plan to the generated path.

2. The method for multiobjective path planning of claim 1, wherein the step of constructing the static cost distribution map (COST) comprises following steps:

initializing A as a set containing only the GOAL, NarrowBand as a set containing neighbor nodes of the START, FarAway as a set containing all nodes on the S-SIMap except for those in A and NarrowBand, and COST$\in R^{M \times N}$ as a zero matrix;

for a node in NarrowBand, determining whether the node is in a prohibited area iteratively, where the prohibited area denotes a known static obstacle area; if not, setting COST[node]=distance_between(node, GOAL)*($\alpha$S-SIMap[node]*VELOCITY+(1-$\alpha$))/VELOCITY, where distance_between (node, GOAL) represents the Euclidean distance between node and GOAL, $\alpha$ is a weight coefficient, and VELOCITY is the velocity of the UAV;

for every node in FarAway, setting COST[node]=+$\infty$;

determining whether NarrowBand and FarAway are empty iteratively, and if both NarrowBand and FarAway are empty, terminating iteration and outputting COST as the static cost distribution map; otherwise, performing the following steps:

recording the least cost node in the NarrowBand as best_neighbor, and adding the best_neighbor to A; determining iteratively whether a neighbor node of best_neighbor is in a prohibited area; if not updating the cost at the neighbor node, according to COST[node]=distance_between(node,best_neighbor)
*($\alpha$S-SIMap[node]*VELOCITY+(1-$\alpha$))/VELOCITY;

then determining whether the neighbor node is in FarAway; if yes, removing the neighbor node from FarAway and adding the neighbor node to NarrowBand.

3. The method for multiobjective path planning of claim 1, the offline search comprises the following steps:

(c1) setting current to the START, initializing the path as a queue containing only, current;

(c2) determining whether current equals to GOAL; if not, determining whether current has neighbor nodes; if not, then returning failure; if yes, then updating current by the least cost neighbor node of the current, and adding the updated current to the end of the path; setting current to the point at the end of the path;

(c3) repeating step (c2) until the current equals to GOAL, then returning path.

4. The method for multiobjective path planning of claim 1, wherein the step of running the obstacle detection module comprises the following steps:

(d1) initializing new_obstacles to an empty set, and is_detected_new_obstacles to false;

(d2) determining iteratively whether each and every node in the detection range of the UAV is an undetected obstacle by checking the value of COST[node]; if yes, adding the node to new_obstacles, and setting is_detected_new_obstacles to true;

(d3) after step (d2) is completed, returning is_detected_new_obstacles and new_obstacles.

5. The method for multiobjective path planning of claim 1, wherein the step of constructing the D-SIMap comprises the following steps:

(I) initializing D-SIMap$\in R^{M\times N}$ by setting it to a zero matrix;

(II) determining whether there exists a node in the detection range of the UAV the horizontal distance between which and a detected obstacle is less than or equal to a prespecified margin; if yes, setting the dynamic safety index of the UAV at $(x_c, y_c)$ to $+\infty$, otherwise, setting the dynamic safety index of the UAV at $(x_c, y_c)$ to 0;

(III) after step (II) is completed, returning D-SIMap.

6. The method for multiobjective path planning of claim 1, wherein the step of updating the dynamic cost distribution map (D_COST) comprises the following steps:

(I) updating the D_COST values for each and every node in the detection range of the UAV by calculating D_COST[node]=distance_between(node, GOAL)*($\alpha$D-SIMap[node]*VELOCITY+(1−$\alpha$))/VELOCITY, where $\alpha$ is a weight coefficient; including the node with D_COST[node]=+$\infty$ in NEW_FORBIDDEN;

(II) after step (I) is completed, returning D_COST and NEW_FORBIDDEN.

\* \* \* \* \*